Jan. 30, 1968  J. R. PINKHAM  3,365,749
PROCESS AND APPARATUS FOR MANUFACTURE OF CIGARETTE FILTERS
Filed Feb. 12, 1965  2 Sheets-Sheet 1
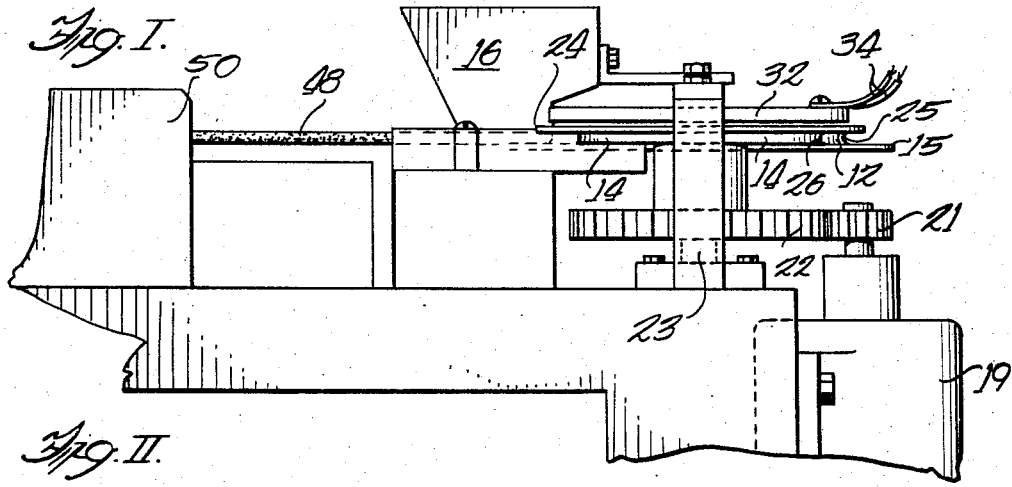
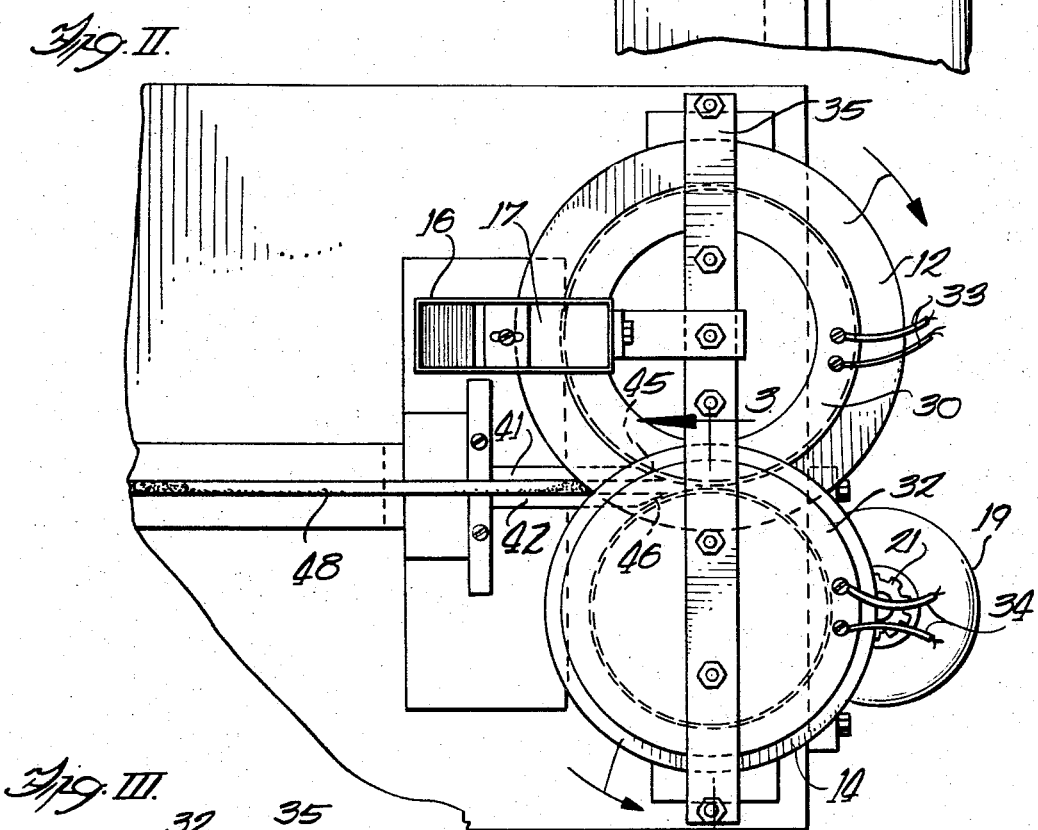
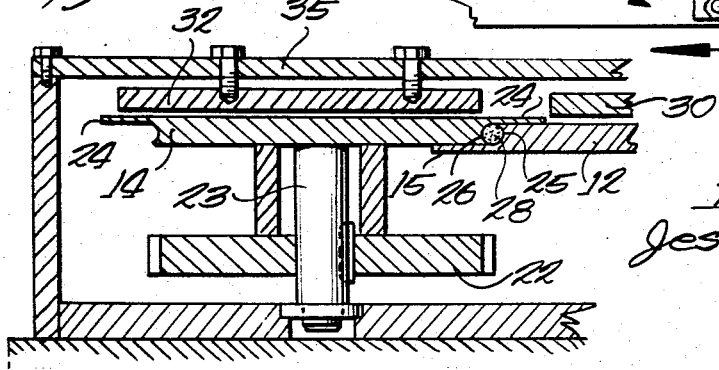
Inventor
Jesse R. Pinkham
Pendleton, Neuman
Seibold & Williams
Attorneys Jan. 30, 1968  J. R. PINKHAM  3,365,749
PROCESS AND APPARATUS FOR MANUFACTURE OF CIGARETTE FILTERS
Filed Feb. 12, 1965  2 Sheets-Sheet 2
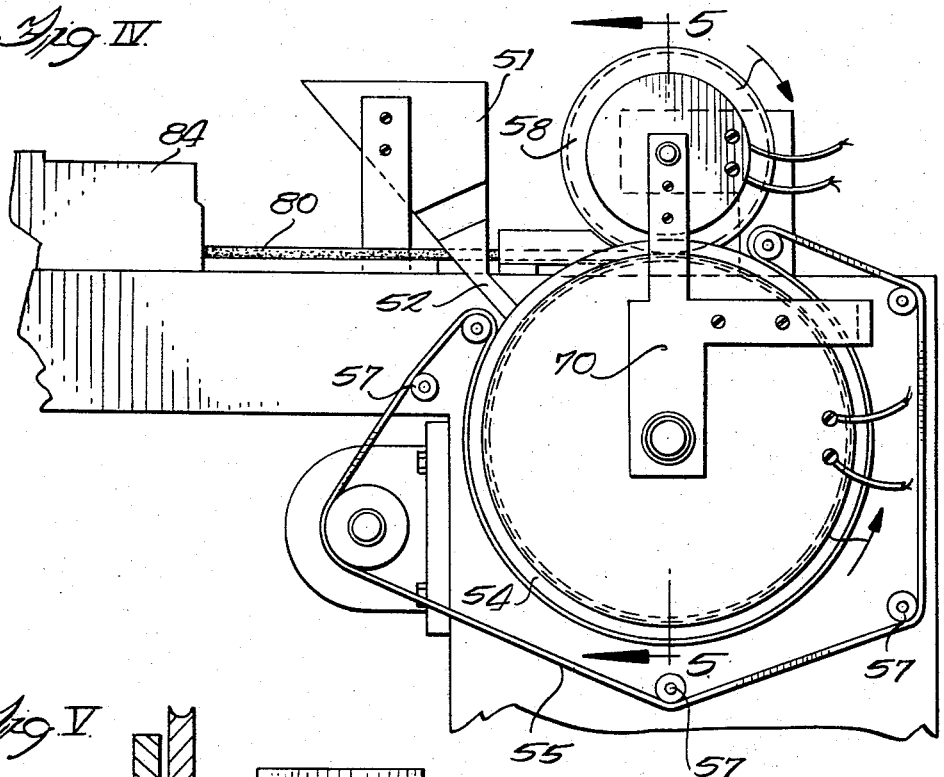
Fig. IV
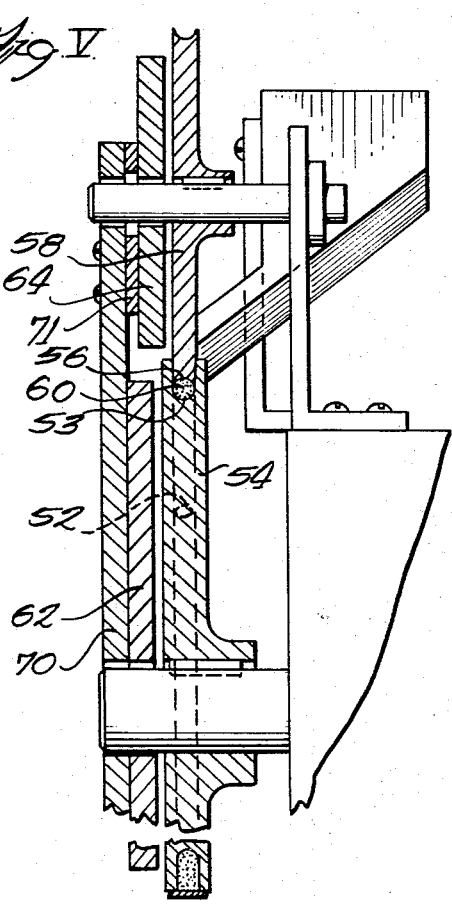
Fig. V
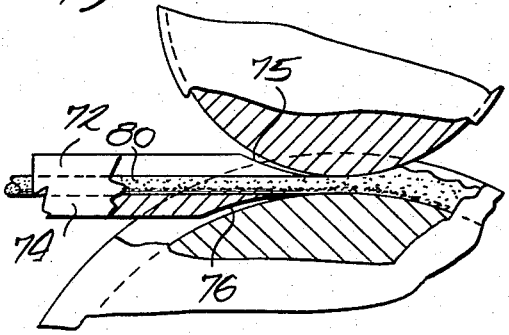
Fig. VI
Inventor
Jesse R. Pinkham
Pendleton, Neuman
Seibold & Williams
Attorneys

United States Patent Office

3,365,749
Patented Jan. 30, 1968

3,365,749
PROCESS AND APPARATUS FOR MANUFACTURE
OF CIGARETTE FILTERS
Jesse R. Pinkham, Winston-Salem, N.C., assignor to R. J.
Reynolds Tobacco Company, Winston-Salem, N.C., a
corporation of New Jersey
Filed Feb. 12, 1965, Ser. No. 432,145
2 Claims. (Cl. 18—9)

This invention relates to methods and apparatus for forming filter elements for cigarettes and the like.

At the present time various types of filter elements are employed in cigarettes and the like to remove selected components from the smoke as it is drawn into the smoker's mouth. One preferred filter is a bonded charcoal filter plug which is made by mixing granules of charcoal with a suitable thermoplastic binder which enables the filter to be formed into a plug of desired size and geometric shape. In making this type of filter a thermoplastic binder material such as polyethylene is mixed with the charcoal granules and the mixture is heated to liquefy the binder and accomplish intimate dispersion thereof throughout the charcoal granules. While at an elevated temperature the mixture is compacted and formed into the desired shape of the filter, generally a cylinder having substantially the same circumference as the cigarette or smoking article with which it is to be employed. Upon subsequent cooling, the mixture solidifies into a substantially homogeneous mass having a form adapting it for use as a filter element for cigarettes and the like. The compacting and forming of the filter is very important since it is desired to obtain filters of substantially uniform density and shape while operating at reasonable production rates.

It is a principal object of the present invention to provide processes and apparatus whereby bonded charcoal filter elements for cigarettes and the like can be quickly and easily manufactured.

It is a further object of the present invention to provide processes and apparatus for producing bonded charcoal filter elements for cigarettes and the like having desired size and shape to complement the smoking article with which they are employed.

It is a still further object of the invention to provide processes and apparatus for forming bonded charcoal filter elements for cigarettes and the like wherein heating, compacting and forming into a filter rod of a mixture of charcoal granules and a thermoplastic binder are performed in one continuous operation at a desired accelerated production rate.

In accordance with the broad aspects of the invention bonded charcoal filter elements for cigarettes and the like are manufactured by mixing proportioned amounts of charcoal granules and a thermoplastic binding material therefor; heating the mixture and simultaneously forming and compacting the material into cylindrical rods having substantially the same circumference as the cigarettes or other smoking article with which the filter is to be employed. The heating, compacting and forming of the filter rods are accomplished by passing a mixture of the charcoal granules and thermoplastic binder between two complementary rotating discs, both of which having on the opposed surfaces thereof continuous matching grooves disposed in substantially tangential relationship so as to form therebetween a space circular in cross section and having substantially the same diameter as a cigarette or other smoking article with which the filter is to be employed. Upon passing between the complementary grooved surfaces of the rotating discs at an elevated temperature the mixture is compacted and formed into a cylindrical filter rod. Thereafter, the formed filter rod is ejected from the rotating discs and cooled to complete solidification. The filter rod can then be utilized as desired, such as, for example, it can be encased in a cigarette wrapper, severed to desired length and combined with a tobacco rod to form a filter cigarette.

The invention will be further described and illustrated with respect to a cigarette filter element and in conjunction with the accompanying drawings in which:

FIGURE I is a side elevational view of one embodiment of novel apparatus for forming filter elements in accordance with the invention.

FIG. II is a plan view of the apparatus of FIG. I.

FIG. III is a partial cross-sectional view taken on the line 3—3 of FIG. II.

FIG. IV is a side elevational view of a second embodiment of novel apparatus for forming filter elements in accordance with the invention.

FIG. V is a partial cross-sectional view taken on the line 5—5 of FIG. IV.

FIG. VI is a partial enlarged view of the apparatus of FIG. IV showing in greater detail the bonded charcoal filter rod as it exits from the forming apparatus.

Referring to the drawings, FIGS. I through III illustrate one embodiment of apparatus according to the invention in which the compacting and forming of the filter element is accomplished in rotating grooved discs 12 and 14 which are disposed in a horizontal plane. Charcoal in the form of relatively finely divided particles which, for example, may suitably range from about 10 to about 50 mesh, U.S. sieve series, is combined in hopper 16 with metered amounts of a suitable thermoplastic binder. Various thermoplastic binders can be employed for binding the particles into an integral mass in the form of a cylindrical rod. Such binders include polyolefins such as polyethylene, polybutene, polyvinyl acetate, polyvinyl chloride and the like. Generally, the binder is employed in an amount ranging from about 5 to about 15% or more by weight of the charcoal granules.

The hopper 16 is provided with a gate 17, the opening of which can be controlled to regulate the amount of material passing from the hopper onto the flange 15 of rotating disc 12. The discs 12 and 14 are rotated in opposite directions, preferably at the same peripheral speed, by means of conventional driving mechanisms. The speed of rotation of the forming and compacting discs 12 and 14 can very widely depending upon the production rate desired. In general, suitable production rates are obtained when the mixture of charcoal granules and binder is fed to the rotating discs at a rate of from about 60 to 90 pounds per hour and the discs are rotated at a peripheral speed of from about 600 to 900 revolutions per minute. The driving mechanism can, for example (illustrated with respect to rotating disc 14), include, in combination, electric motor 19, gear 21 aligned in meshing engagement with gear 22 into which there is journaled axle 23 which in turn effects rotation of disc 14. The tangentially opposed grooved surfaces of discs 12 and 14 are provided with complementary flanges and grooves so that when they come into mating or tangential engagement a substantially closed space, circular in cross section, is provided therebetween. It will be seen in FIG. III that the discs 12 and 14 are aligned so that the flange 24 on disc 14 overrides disc 12 while conversely the flange 15 lies beneath disc 14. The dimensions of the flanges 15 and 24 and the grooves 25 and 26 on discs 12 and 14 respectively are such as to form a substantially perfect circular space 28 therebetween. Thus, as the discs 12 and 14 rotate and the grooves 25 and 26 mate or mesh, the charcoal granules are continuously compacted in this space and formed into a cylindrical rod.

Mounted above, but closely adjacent, to each of the rotating forming and compacting discs 12 and 14 are heating rings 30 and 32. These heating rings can, if desired, be attached directly to the rotating discs 12 and 14 so as to rotate therewith. The heating rings 30 and 32 have embedded therein electrical resistance heating elements which connect to a source of electrical energy by contacts 33 and 34. The heating elements should be capable of heating the thermoplastic binder to a temperature sufficient to liquefy it and permit its intimate dispersion throughout the mass of finely divided charcoal granules. The particular temperature required in each instance will therefore depend upon the particular thermoplastic material employed as binder. As illustrative, a temperature of about 220° F. is sufficient when employing polyethylene as the binder while higher or lower temperatures may be practical with other binder materials.

A supporting frame 35 extends transversely across the top of the filter forming apparatus to support the heating rings 30 and 32. A suitable scraper mechanism is provided adjacent the point where the formed filter rod emerges from between the grooved mating surface 25 and 26 of the rotating discs 12 and 14. This scraper can take various forms and may comprise, for example, two spaced metallic members 41 and 42, each having a contoured tip 45 and 46 respectively which project substantially within the nip of the rotating discs 12 and 14. The bonded charcoal filter 48 exits from the apparatus of the invention in a substantially continuous integral cylindrical rod. It can then be conveyed to conventional apparatus, designated generally by the numeral 50, employed in the cigarette industry for further processing such as, for example, for encasement in a cigarette wrapper paper and for cutting to the desired filter length.

Another embodiment of the apparatus of the present invention is illustrated in FIGS. IV through VI. In this embodiment the two rotating filter forming and compacting discs are disposed in vertical relationship. A mixture of charcoal granules and thermoplastic binder is fed from hopper 51 through a chute 52 having means therein to control flow rate of feed material and is directed onto the grooved surface 53 of rotating disc 54. In actual practice, the rate of flow is adjusted to maintain the space or void between the conveyor belt 55 and the groove 53 substantially completely filled, and to this end the terminal end of chute 52 is positioned near the groove 53. Conveyor belt 55 traversing a series of rollers 57 cooperates with disc 54 to convey the charcoal-binder mixture for compacting and forming into the filter rod. These latter operations are accomplished as the mixture passes into the compacting zone formed by the grooved surface 53 of rotating disc 54 and the grooved surface 56 of rotating disc 58. As will be noted in FIG. V, the grooved surface 56 on rotating disc 58 forms a substantially cylindrical space 60 when it mates with the grooved surface 53 on disc 54. Again, heating rings 62 and 64 are disposed closely adjacent to the rotating discs 54 and 58 so as to heat the binder and render it thermoplastic. The heating elements 62 and 64 could, if desired, be attached directly to the rotating discs 54 and 58, but as shown in the drawing the heating elements are supported on frame 70 with spacers 71 maintaining ring 64 adjacent disc 58. The rotating discs 54 and 58 are driven by conventional means such as described with reference to FIGS. I through III.

Likewise, as in the previous embodiment, a scraper element comprising two spaced metallic rods 72 and 74 having contoured tip portions 75 and 76 respectively, are positioned adjacent the nip of the rotating discs 54 and 58 so as to insure that the filter rod 80 exits properly from the filter compacting and forming discs 54 and 58. The filter rod 80, as previously indicated, can then be conveyed to conventional cigarette apparatus 84 for further processing.

The advantages of the invention are manifest from the foregoing description. Among the foremost advantages of the invention are (1) there can be readily manufactured a cigarette filter element having proper size and shape so as to complement the tobacco rods normally employed in the manufacture of filter cigarettes, (2) the filter elements produced in accordance with the invention have uniform density, (3) greater quantities of the charcoal smoke absorbent can be employed per unit area of the filter, (4) due in large part to enumerated advantages 2 and 3, superior filtering is achieved in that the possibility of smoke by-passing the absorbent charcoal granules is minimized, and (5) the process of manufacturing the filter elements is a relatively clean process which lends itself to mechanization and quality control.

Those modifications and equivalents which fall within the spirit of the invention and the scope of the appended claims are to be considered part of the invention.

I claim:

1. Apparatus for forming a cylindrical filter element for smoking articles which comprises, in combination, a substantially vertical disc member, a second substantially vertical disc member, both of said disc members having complementary grooves on the opposed surfaces thereof disposed in substantially tangential relationship so as to form therebetween a space of substantially circular cross section, means for rotating both of said disc members, heating means for heating material in contact with said disc members, belt means extending around a substantial proportion of the periphery of said second vertical disc member and forming with the said groove therein a carrying chamber, means for supplying proportional amounts of filter granules and a thermoplastic binder into the chamber formed by said belt means and said second vertical disc member, said belt means being movable and cooperating with said second vertical disc member to convey said filter granules and said thermoplastic binder into the mated complementary grooves of both of said vertical disc members for forming a cylindrical filter rod by said discs, and scraper means located adjacent the point where the said cylindrical filter emerges between said rotating discs.

2. Apparatus for forming a cylindrical filter element for cigarettes which comprises, in combination, a substantially vertical disc member, a second substantially vertical disc member, both of said disc members having complementary grooves on the opposed surfaces thereof disposed in substantially tangential relationship so as to form therebetween a space of substantially circular cross section and of substantially the same diameter as a cigarette, means for rotating both of said disc members, heating means for heating material in contact with said disc members, belt means extending around a substantial proportion of the periphery of said second vertical disc member and forming with the said groove therein a carrying chamber, means for supplying proportioned amounts of filter granules and a thermoplastic binder into the chamber formed by said belt means and said second vertical disc member, said belt means being movable and cooperating with said second vertical disc member to convey said filter granules and said thermoplastic binder into the mated complementary grooves of both of said vertical disc members for forming a cylindrical filter rod by said discs, and scraper means located adjacent the point where the said cylindrical filter emerges between said rotating discs.

References Cited

UNITED STATES PATENTS

| | | | |
|---|---|---|---|
| 1,226,949 | 5/1917 | Clark | 18—9 |
| 2,410,312 | 10/1946 | Storch | 18—9 |
| 2,556,008 | 6/1951 | Spalding | 100—93 |
| 2,760,229 | 8/1956 | Cheney et al. | 18—19 X |
| 2,998,623 | 9/1961 | Lawson et al. | 18—9 |
| 2,739,546 | 3/1956 | Bonnafoux | 107—10 |
| 2,977,631 | 4/1961 | Komarek et al. | 18—9 X |
| 3,017,665 | 1/1962 | Dasher et al. | 18—9 |
| 3,123,656 | 3/1964 | Rochlin | 18—9 X |
| 3,124,838 | 3/1964 | Lund et al. | 18—9 |
| 3,212,137 | 10/1965 | Lemettre | 18—9 X |

FOREIGN PATENTS

| | | |
|---|---|---|
| 417,611 | 9/1925 | Germany. |
| 453,234 | 12/1927 | Germany. |
| 881,684 | 11/1961 | Great Britain. |
| 249,067 | 1/1926 | Italy. |
| 558,292 | 2/1957 | Italy. |

WILLIAM J. STEPHENSON, *Primary Examiner.*

UNITED STATES PATENT OFFICE
CERTIFICATE OF CORRECTION

Patent No. 3,365,749

January 30, 1968

Jesse R. Pinkham

It is hereby certified that error appears in the above numbered patent requiring correction and that the said Letters Patent should read as corrected below.

Column 6, after line 1, insert the following:

3,039,137      6/1962    Smith et al----18-9X same column 6, line 5, for "417,611" read -- 418,611 --.

Signed and sealed this 25th day of March 1969.

(SEAL)
Attest:

Edward M. Fletcher, Jr.
Attesting Officer

EDWARD J. BRENNER
Commissioner of Patents